US012626313B2

(12) United States Patent
Neto

(10) Patent No.: US 12,626,313 B2
(45) Date of Patent: May 12, 2026

(54) STRONG MOUNTING SYSTEM FOR GREASED PLASTIC-COATED PRESTRESSING TENDONS, INTELLIGENT REUSABLE MODULAR STRUCTURE, STRONG SUPPORT AND FASTENER FOR FASTENING A TENDON IN A STRONG SUPPORT

(71) Applicant: EVEHX North America, LLC, Miami, FL (US)

(72) Inventor: Ernani Simas Alves Neto, Curitiba (BR)

(73) Assignee: EVEHX North America, LLC

( * ) Notice: Subject to any disclaimer, the term of this patent is extended or adjusted under 35 U.S.C. 154(b) by 396 days.

(21) Appl. No.: 18/525,134

(22) Filed: Nov. 30, 2023

(65) Prior Publication Data

US 2024/0177252 A1 May 30, 2024

Related U.S. Application Data

(63) Continuation of application No. PCT/BR2021/050236, filed on Jun. 1, 2021.

(51) Int. Cl.
*G06Q 50/08* (2012.01)
*E04G 21/12* (2006.01)

(52) U.S. Cl.
CPC ............. *G06Q 50/08* (2013.01); *E04G 21/12* (2013.01)

(58) Field of Classification Search
CPC ................................ G06Q 50/08; E04G 21/12
See application file for complete search history.

(56) References Cited

U.S. PATENT DOCUMENTS

| | | | | |
|---|---|---|---|---|
| 762,875 A | | 6/1904 | Blodgett | |
| 4,008,916 A | | 2/1977 | Ide | |
| 4,195,732 A | * | 4/1980 | Bell | B65D 19/44 206/443 |
| 6,151,850 A | * | 11/2000 | Sorkin | E04C 5/122 52/223.13 |

(Continued)

FOREIGN PATENT DOCUMENTS

| | | |
|---|---|---|
| BR | 102018068999 A2 | 5/2019 |
| CN | 209668612 U | 11/2019 |

(Continued)

OTHER PUBLICATIONS

International Search Report, International Application No. PCT/BR2021/050236 dated Aug. 25, 2021.
Written Opinion of the International Search Authority, International Application No. PCT/BR2021/050236 dated Aug. 25, 2021.

*Primary Examiner* — Paola Agudelo
(74) *Attorney, Agent, or Firm* — Richard A. Fagin

(57) ABSTRACT

An assembly method is described for greased, plastic coated and prestressed concrete reinforcing tendons, comprising a work plan, an intelligent and reusable modular structure (modular box), a resistant support and a fixer for the tendons in resistant support, aiming to solve problems of storage, productivity, transport, construction process, generating improvement in technical qualification, thus obtaining a faster, more accurate and safer conference, associated with the color system inserted in a work plan. This method is used in the field of Civil Construction, especially in the execution of prestressed massive flat slabs.

1 Claim, 17 Drawing Sheets

(56) References Cited

U.S. PATENT DOCUMENTS

| | | | | |
|---|---|---|---|---|
| 8,613,172 | B2 * | 12/2013 | Olson | E04B 5/10 52/223.6 |
| 9,132,994 | B2 * | 9/2015 | Ferchaud | B66C 1/16 |
| 11,174,651 | B1 * | 11/2021 | Fischer | E04C 5/125 |
| 2004/0159058 | A1 * | 8/2004 | Gulbenkian | E04C 5/10 52/223.14 |
| 2012/0297694 | A1 * | 11/2012 | Kim | E04G 21/12 52/223.13 |
| 2018/0209134 | A1 * | 7/2018 | Calderon Uriszar-Aldaca | E04B 1/043 |
| 2019/0003182 | A1 * | 1/2019 | dos Santos | E04C 5/12 |
| 2021/0131105 | A1 * | 5/2021 | Xing | E04G 21/12 |
| 2021/0156161 | A1 * | 5/2021 | Taylor | E04C 5/10 |
| 2021/0301532 | A1 * | 9/2021 | Sorkin | E04C 5/12 |
| 2021/0381239 | A1 * | 12/2021 | Langston | E04C 5/125 |

FOREIGN PATENT DOCUMENTS

| | | | |
|---|---|---|---|
| CN | 209872127 | U | 12/2019 |
| JP | H01318642 | A | 12/1989 |
| JP | H0387454 | A | 4/1991 |
| JP | H0662041 | U | 9/1994 |
| JP | H0748898 | A | 2/1995 |
| JP | H08144435 | A | 6/1996 |
| JP | 2000192662 | A | 7/2000 |
| JP | 200210611 | A | 4/2002 |
| JP | 2002213084 | A | 7/2002 |
| JP | 2004278076 | A | 10/2004 |
| JP | 2015059344 | A | 3/2015 |

* cited by examiner

| CABLES | AMOUNT | LENGTH | COLOR 1 | COLOR 2 | METERS | KILOS | PRE-BLQ |
|---|---|---|---|---|---|---|---|
| C3-C6 | 12 | 31,37 | BLACK | BLACK | 376,44 | 338,80 | YES |
| C7-C9 | 9 | 31,22 | BLUE | BLUE | 280,98 | 252,88 | YES |
| C18 | 3 | 16,28 | BROWN | BROWN | 48,84 | 43,96 | YES |
| C12,C14,C16 | 9 | 15,51 | RED | RED | 139,59 | 125,63 | YES |
| C2 | 2 | 15,18 | YELLOW | YELLOW | 30,36 | 27,32 | YES |
| C10 | 3 | 14,31 | GREEN | GREEN | 42,93 | 38,64 | YES |
| C1 | 2 | 13,24 | ORANGE | ORANGE | 26,48 | 23,83 | YES |
| C19 | 3 | 12,27 | WHITE | WHITE | 36,81 | 33,13 | YES |
| C11,C13,C15,C17 | 12 | 11,61 | PURPLE | PURPLE | 139,32 | 125,39 | YES |
| C31-C33 | 12 | 14,85 | PINK | PINK | 178,20 | 160,38 | YES |
| C34-C39 | 21 | 14,80 | SILVER | SILVER | 310,80 | 279,72 | YES |
| C30 | 4 | 14,70 | GOLDEN | GOLDEN | 58,80 | 52,92 | YES |
| C20-C25 | 21 | 14,55 | BLACK | BLUE | 305,55 | 275,00 | YES |
| C26-C28 | 12 | 9,45 | BLACK | BROWN | 113,40 | 102,06 | YES |
| C29 | 4 | 8,85 | BLACK | RED | 35,40 | 31,86 | YES |
| TOTAL BLOCKED | 129 | | | | 2.123,90 | 1.911,52 | |
| TOTAL | 129 | | | | 2.123,90 | 1.911,52 | |

FIG. 4D

| SURVEY OF RESISTANT SUPPORT | | | | | |
|---|---|---|---|---|---|
| CONSTRUCTION COMPANY: | | GLOBOCON | | | |
| WORK: | | TRINDADE | | | |
| FLOORING: | | 1° FLOORING - 3° STAGE | | | |
| SUPPORT COLOR: | | HEIGHT | LENGTH 1 | QUANT. "U" | QUANT. BARS |
| 3/4cm | | 6 | 207 | 483 | 60 |
| PINK | | 7 | 60 | 140 | 18 |
| ORANGE | | 8 | 87 | 203 | 25 |
| BROWN | | 9 | 228 | 532 | 67 |
| YELLOW | | 10 | 33 | 77 | 10 |
| BLUE | | 11 | 21 | 49 | 6 |
| RED | | 12 | 369 | 861 | 108 |
| WHITE | | 13 | 12 | 28 | 4 |
| GREEN | | 14 | 126 | 294 | 37 |
| BLACK | | 15 | 24 | 56 | 7 |
| SILVER | | 16 | 99 | 231 | 29 |
| GOLDEN | | 17 | 120 | 280 | 35 |
| BLACK | BLUE | 18 | 6 | 16 | 2 |
| BLACK | ORANGE | 19 | 3 | 8 | 1 |
| BLACK | GREEN | 20 | 6 | 16 | 2 |
| BLACK | WHITE | 21 | 99 | 264 | 33 |
| BLACK | BROWN | 22 | | 0 | 0 |
| BLACK | YELLOW | 23 | 3 | 8 | 1 |
| BLACK | RED | 24 | 3 | 8 | 1 |
| BLACK | GOLDEN | 25 | 3 | 8 | 1 |
| BLACK | SILVER | 26 | | 0 | 0 |

FIG. 4E

| DISTRIBUTED 1 AND DISTRIBUTED 2 | | | | | | |
|---|---|---|---|---|---|---|
| SUPPORT COLOR | 2"U"S | 3"U"S | 4"U"S | 5"U"S | 7"U"S | TOTAL "U"S |
| PINK | | | 2 | 2 | | 18 |
| ORANGE | | | | | | 0 |
| BROWN | | 1 | | 2 | | 10 |
| YELLOW | | 1 | 3 | 3 | | 27 |
| BLUE | | | | 3 | | 15 |
| RED | | | 1 | 3 | | 19 |
| WHITE | | | 1 | | | 4 |
| GREEN | | | | | | 0 |
| BLACK | | | | 4 | | 20 |

FIG. 4G

| ANCHORAGES | | |
|---|---|---|
| A | P | I |
| 18 | 18 | |
| 56 | 56 | |

FIG. 4H

STRONG MOUNTING SYSTEM FOR GREASED PLASTIC-COATED PRESTRESSING TENDONS, INTELLIGENT REUSABLE MODULAR STRUCTURE, STRONG SUPPORT AND FASTENER FOR FASTENING A TENDON IN A STRONG SUPPORT

CROSS REFERENCE TO RELATED APPLICATIONS

Continuation of International Application No. PCT/BR2021/050236 filed on Jun. 1, 2021, which application is incorporated herein by reference in its entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

This disclosure refers to an assembly method for greased, plastic coated and prestressed tendons, consisting of a work plan, an intelligent and reusable modular structure (modular box), a resistant support and a fixer for tendon in resistant support, aiming to solve problems of storage, productivity, transport, construction process, generating improvement in technical qualification, thus obtaining a faster, more accurate and safer conference, associated with the color system inserted in the design plan work.

TECHNICAL FIELD

This disclosure applies to the field of Civil Construction, especially in the execution of prestressed massive flat slabs.

BACKGROUND

The application of prestressing greased tendons on slabs has been the structural solution that has shown the greatest growth in recent times. Although some structures with prestressed slabs were first executed in Europe, the real development of these structures took place in the USA, and could grow much more through greater dissemination of this application among professionals in the area, especially those who have not yet had contact with prestressing.

In Europe, interest in this form of construction was renewed around the 1970s. Some constructions were carried out in this period, most notably in Great Britain, the Netherlands and Switzerland. Prestressed slabs with non-adherent tendons have been used for over 50 years in the United States. Subsequently, an anticorrosive protection was developed consisting of a polyethylene or polypropylene tube and a secondary protection consisting of a special grease that involves the tendon (greased and plastic coated tendons).

The document U.S. Pat. No. 4,008,916 A (IDE ALLAN R) relates to cargo handling devices and more particularly to devices for collecting a plurality of pieces of cargo together in unit form for transport as a one-point unit to another.

The document BR 102018068999 A2 (BOEING CO [US]) generally refers to systems and methods for lifting and moving objects. More particularly, the present disclosure relates to a system and method for lifting relatively large, heavy and irregularly shaped objects, such as internal components for an aircraft.

The document JP 2004278076 A (TAKAHASHI SEISAKUSHO KK) refers to a spacer that can be used as two types of reinforcing steel for a prestressed concrete structure and a protective sheath of PC cable.

The document JP H01318642A (TAKENAKA KOMUTEN CO) discloses a way intended to easily fix cross reinforcements by forming notched grooves to fit the externally crossed reinforcements in the peripheral walls of a shell body, and providing the notched grooves, with entry sections of groove widths greater than the reinforcement diameters and the removal of impermeable sections from groove widths smaller than the reinforcement diameters.

The document JP H0748898 A (KAJIMA CORP) refers to a plurality of unalloyed PC steel wires grouped in advance with a spacer assembly template.

In Brazil, the use of greased and plastic coated wire tendons only became viable from 1997 onwards, with their manufacture by Companhia Siderurgica Belgo-Mineira. Ever since, this new technology has been widely used, mainly in smooth flat slabs, adequately controlling deflections and cracking, obtaining an excellent quality structure. Prestressed flat slabs have a reduced height and, as they do not have beams, allow total flexibility both in the distribution of pipes and ducts, and in the arrangement of dividing walls, and are therefore indicated both in office buildings and in apartment buildings.

The main advantages offered by prestressed concrete for slabs are:

a) Structure tested in real time;
b) Control of deformations generating a load contrary to the permanent weight;
c) Decrease in the number of beams and pillars;
d) Weight reduction reducing the cost of foundations;
e) Flat slabs;
f) Larger spans;
g) Ease of assembling the molds, generating lower labor costs;
h) Freedom of space inside the building;
i) Architectural freedom.

The constructive process is usually done with positive reinforcement distribution; distribution, fixing and locking of greased tendons; placement of negative reinforcement and, finally, concreting. It so happens that currently the process of distributing, locking and fixing the greased tendons is done on steel bars, placed transversely to the tendons, which have a predetermined elevation, guaranteed by plastic supports that have different heights. This locking is done using wire, fixing each tendon and plastic support to the transverse bar, which entails laborious and time-consuming labor. It is worth mentioning that the plastic supports available on the market to support the transverse steel bar have a predetermined height, with minimum variations of 0.5 cm, which does not allow for more accurate adjustments. In addition, the cost of assembly in the current method is greater than that of this new method, which is the subject of this disclosure.

It can be mentioned as disadvantages present in the background art:

The amount of materials and support bars to be used depends on the interpretation of the person responsible for the execution, generating leftovers/shortages or waste thereof, in addition to the difficulty in assertiveness of the quantities of materials sent to the work, requiring correction margins to compensate the diversity of interpretation. Also generating problems with excessive amount of wires, causing waste, more dirt on the slab and the need for subsequent cleaning;
- The fragility of the plastic materials used, generating rework in replacing the damaged ones and insecurity of their use during the concrete placement;
- The difficulty in lifting the materials onto the slab, due to the lack of anchorage in the raffia bags, creating difficulty and danger in vertical transport;
- The storage of materials inside the warehouse in wooden bays, making it difficult to control the entry and exit of materials;
- The lack of instruction in the assembly sequence of the method, generating possible reading errors and reworks.

Objective of the Invention

As objectives of the present invention, the following stand out:
- Obtain an intelligent and reusable modular structure, separated into four main modules, which are identified by colors and numbers according to the assembly sequence stipulated by the work plan, which is the constructive assembly method, as well as the correct quantities that they must be used for each section and stage of the assembly;
- A resistant support, which is a high resistance steel support, identified by colors according to the work plan, making it very easy to assemble.
- Tendon fixers, which are plastic parts that can be modulated to lock one, two, three or four tendons to the resistant support, working as if it were a clamp.

BRIEF DESCRIPTION OF THE DRAWINGS

FIG. 4D shows the generic cutting sheet used as an example.

FIG. 4E shows an example of a resistant support spreadsheet for solid slabs.

FIG. 4G shows the number of supports to be placed in a certain part of the slab.

FIG. 4H shows the spreadsheet with a summary of the number of active and passive anchorages in the work.

DETAILED DESCRIPTION

The present disclosure refers to an assembly method for greased, and plastic coated prestressed tendons, consisting of a work plan, an intelligent and reusable modular structure (intelligent modular box), a resistant support and a fixer for tendon in the resistant support. Next, the figures that make up the disclosure will be represented and described in detail.

Figure 1B:
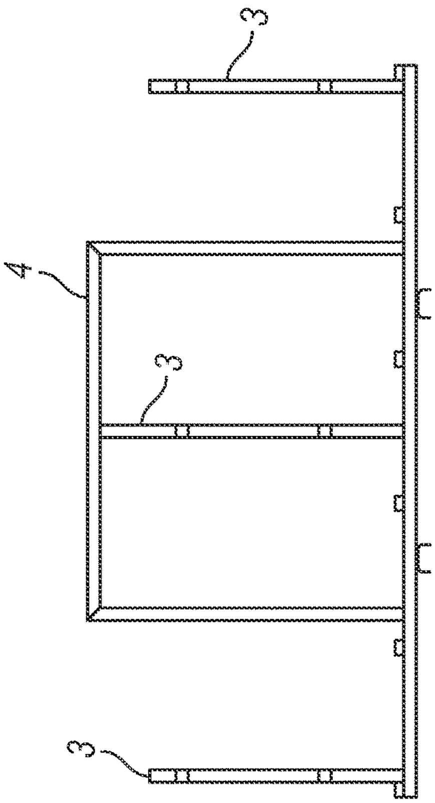
FIGS. 1A, 1B and 1C are representative of the formation of the main base structure for lifting the box that supports the storage modules of resistant supports.
Figure 1C:
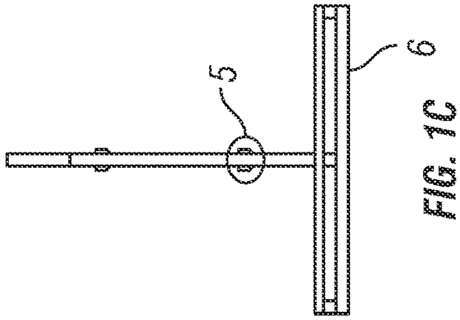
Figure 1A:
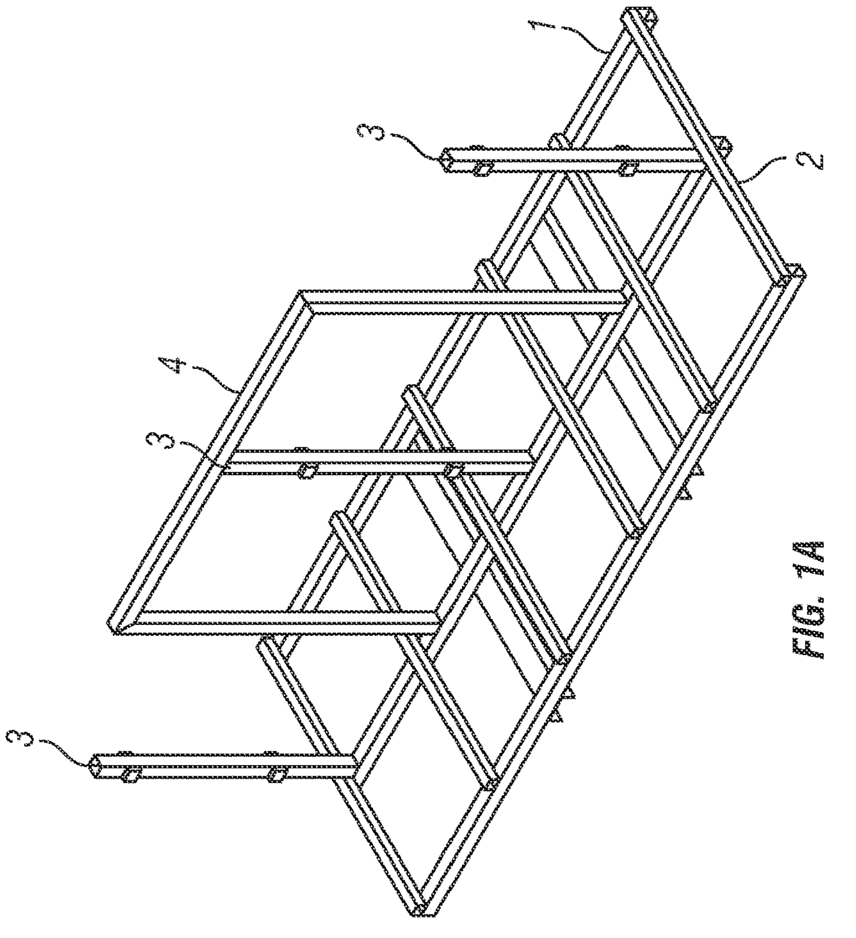

FIGS. 1A, 1B and 1C are representative of the formation of the main base structure for lifting the box that supports the storage modules of resistant supports for the assembly of the elevations of greased tendons for bespoke solid slabs. FIG. 1A (three-dimensional) and 1B (two-dimensional) are composed of: metallic stringers that are primary structures to support the lower storage modules (1); metal transverse beams that are secondary structures to support the lower storage modules (2); metal pillars that are vertical metal structures to support the fixtures that support the secondary modules (3); metal lifting pillars that are centralized vertical structures responsible for the lifting point of the structure (4).

FIG. 1C shows the metal couplings that are the structures responsible for supporting the upper modules (5) and the metal pallet truck that is the structure responsible for fitting horizontal transport, for example, pallet trucks and forklifts (6). The modules (5) make up the box. The metal structure is a base structure for both the lower layer, which are two boxes, and the crimps in the pillars (description) that support the upper modules. The main structure is also a lifting structure (central pillars with the bar on top) and the lower base which is the support for the lower transverse beam modules and stringers.

FIGS. 2A, 2B, 2C and 2D represent the dimensions of the box (FIG. 2A) and the structure, the sealing wooden boxes as well as the metal straps for manual transport and the embedding of these modules in the main structure (1) of FIG. 1A. Storage modules for resistant supports for assembling the elevations of greased wire tendons for bespoke solid slabs.

Figure 2A:
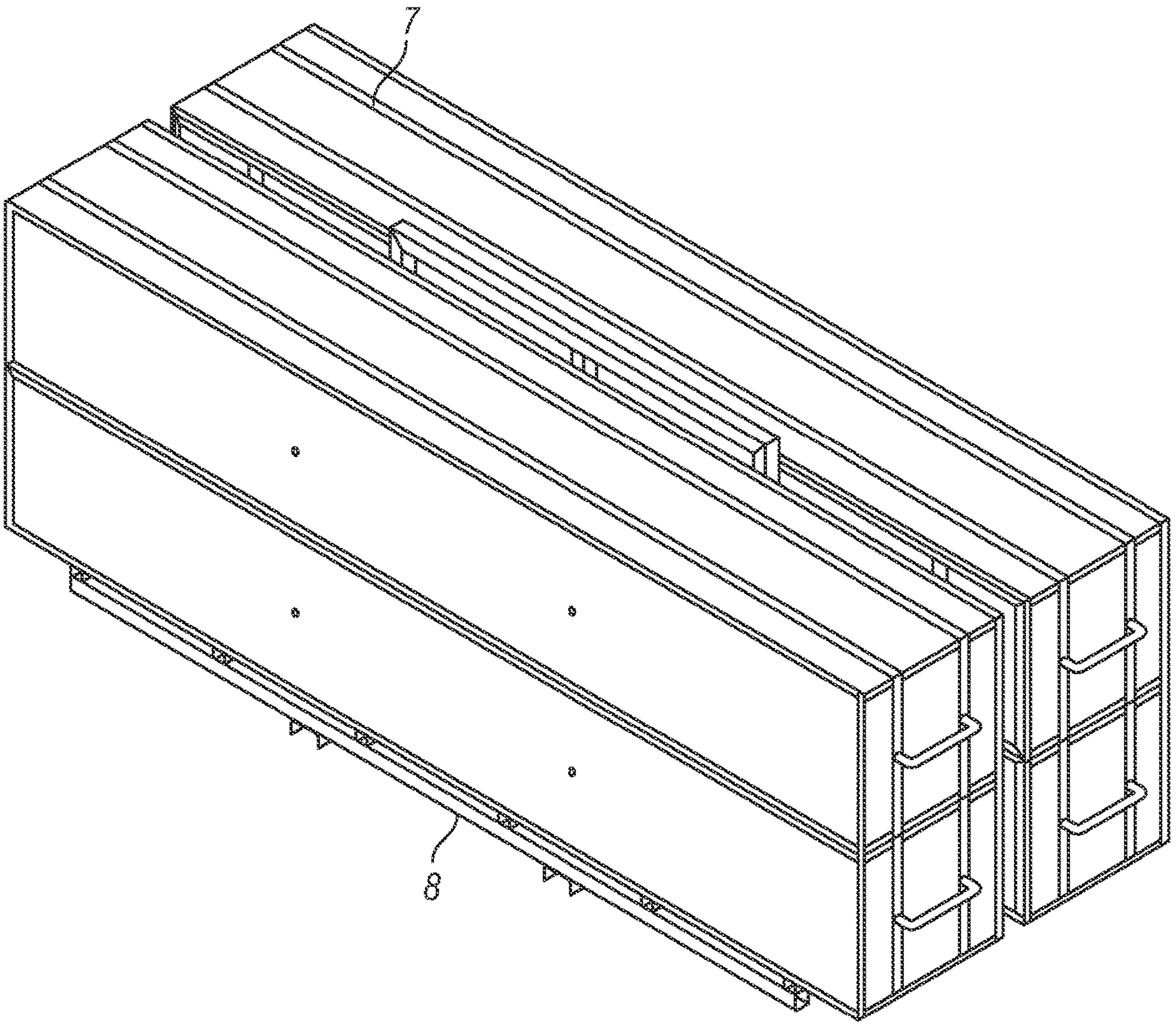
FIGS. 2A, 2B, 2C and 2D represent the dimensions of the box and the structure, the sealing wooden boxes as well as the metal straps for manual transport and the embedding of these modules in the main structure.

In FIG. 2A, the metallic strap, a support structure for the metallic strap and resistance of the sealing walls of the modules (7); the module's support can also be seen, with a hole for fitting in the metallic setting of the metallic pillars of the main structure (8) (FIGS. 1A, 1B and 1C).

Figure 2B:
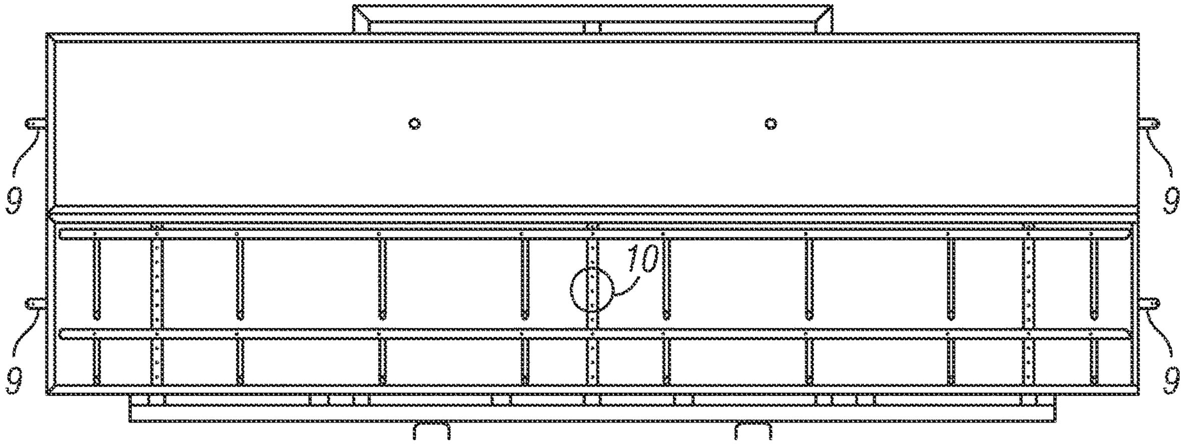

In FIG. 2B, there are the metallic handles (9) that are the accessories for the manual transport of the storage modules. Furthermore, there is the crimping strap (10), a metallic strap responsible for crimping the structure hangers (11) for the resistant supports.

Figure 2C:
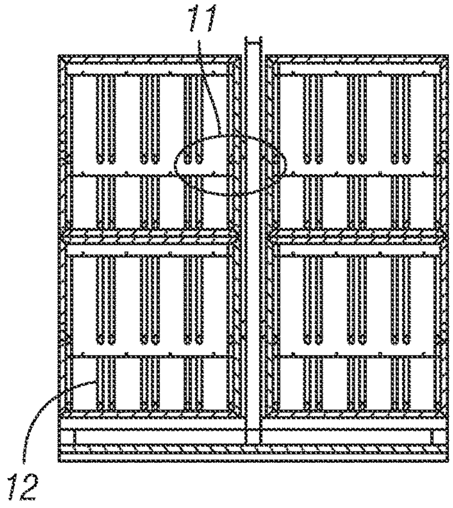

In FIG. 2C, the said structure hangers (11) are shown, which are responsible for supporting and storing the resistant supports (12), for the product stored in the modules, with specific quantities according to the survey carried out in the plan of work for each group of cables of a certain area of the slab.

Figure 2D:
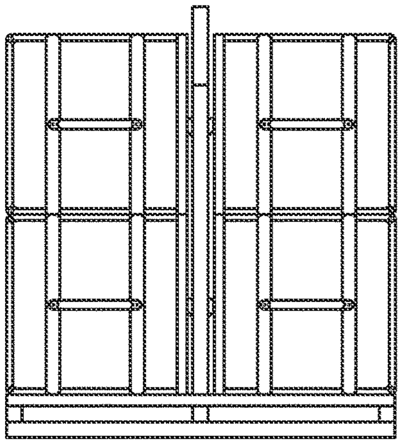

FIG. 2D shows the outer part of the front of the box, which is separated into four modules, where each module contains a number of resistant supports predefined by the work plan.

Figure 3:
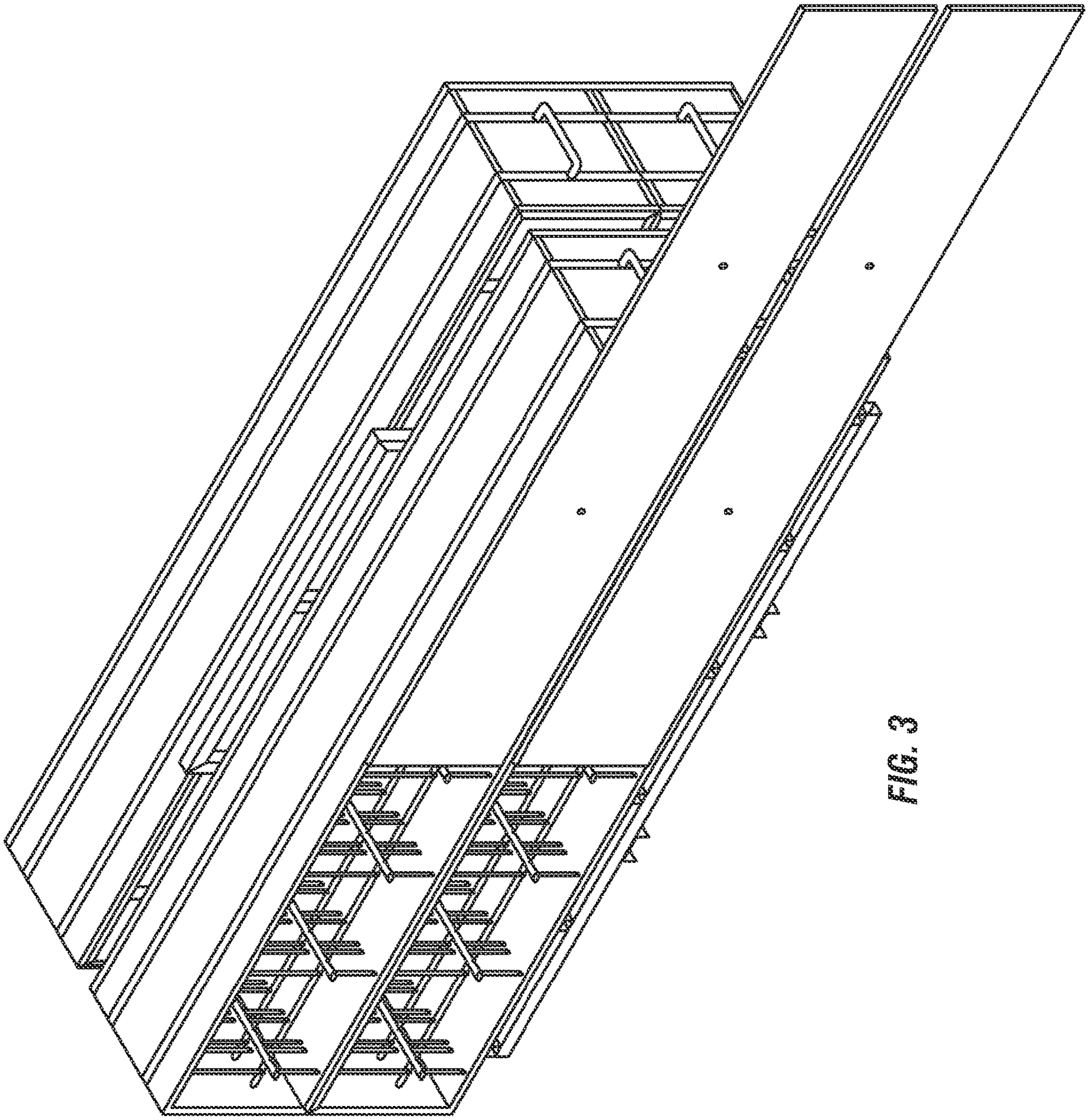
FIG. 3 represents the box, the main structure with all the modules positioned and with resistant supports stored.

FIG. 3 represents the box, the main structure with all the modules positioned and with resistant supports stored.

Figure 4:
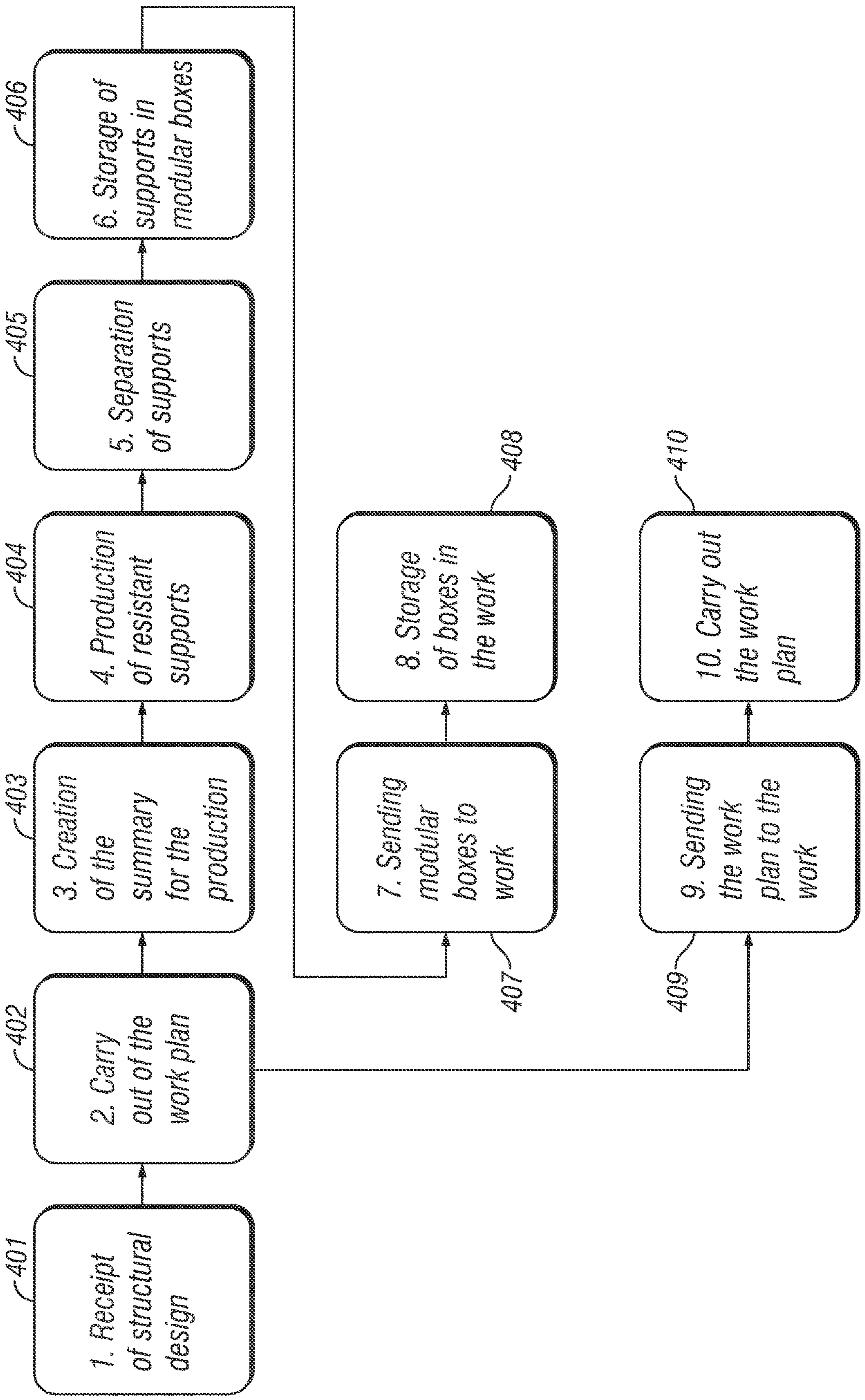
FIG. 4 shows a general flowchart of steps of the resistant assembly method.
Figure 6:
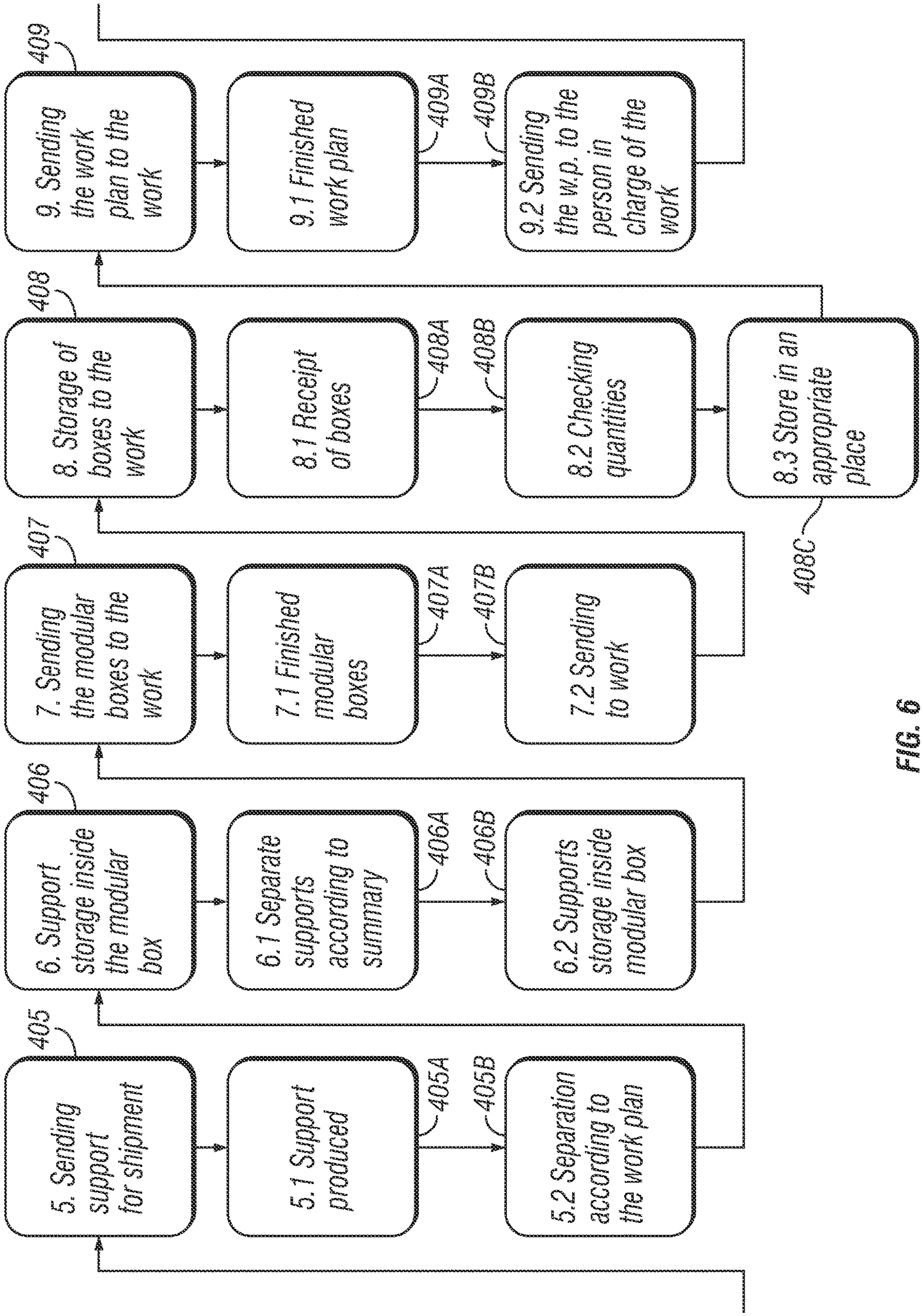
FIG. 6 shows a flowchart and detailed description of steps 6 through 9 (406 through 409 in FIG. 4) in the method.
Figure 7:
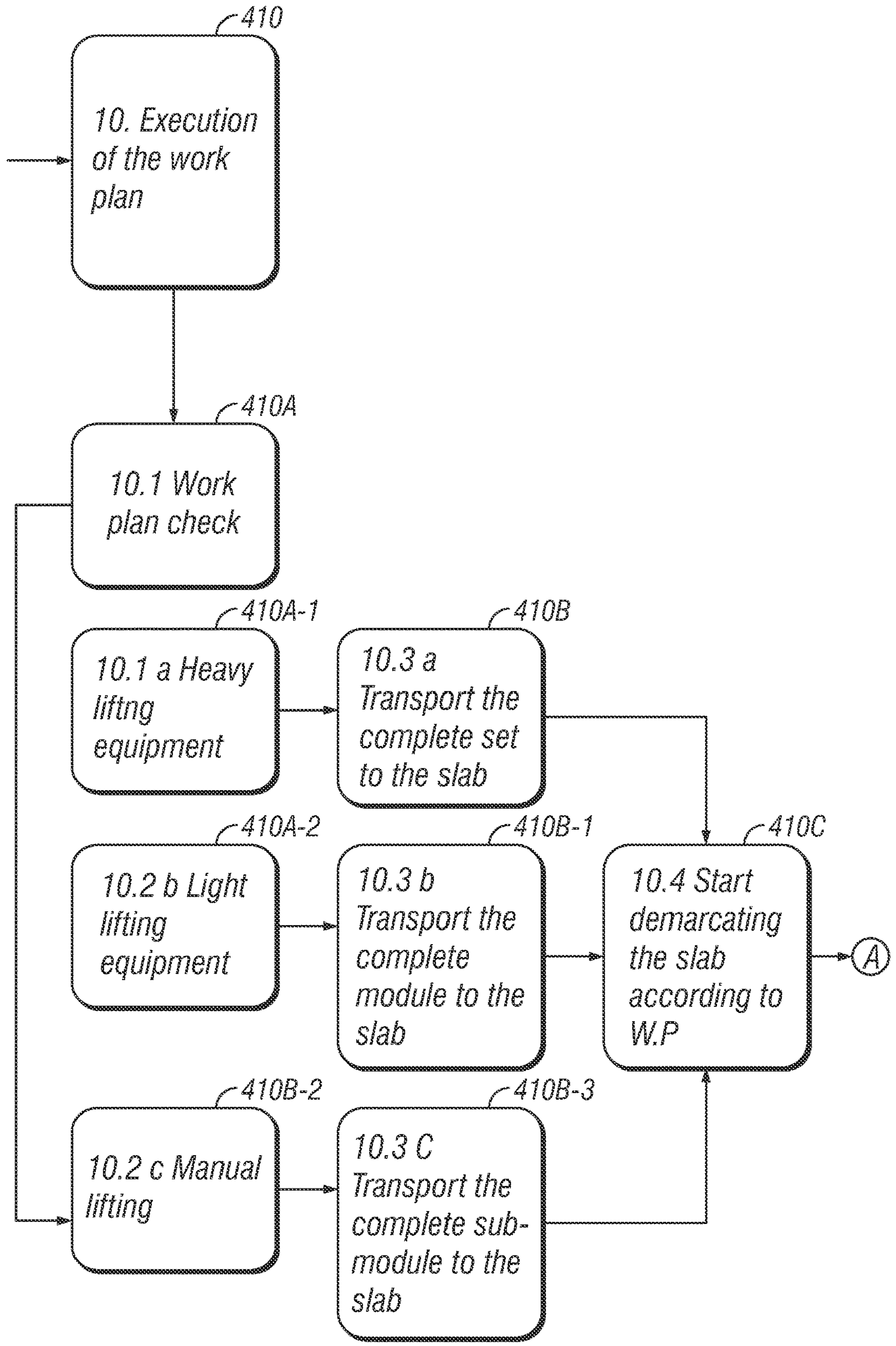
FIG. 7 shows a flowchart and detailed description of step 10 (410 in FIG. 4) in the method.
Figure 7:
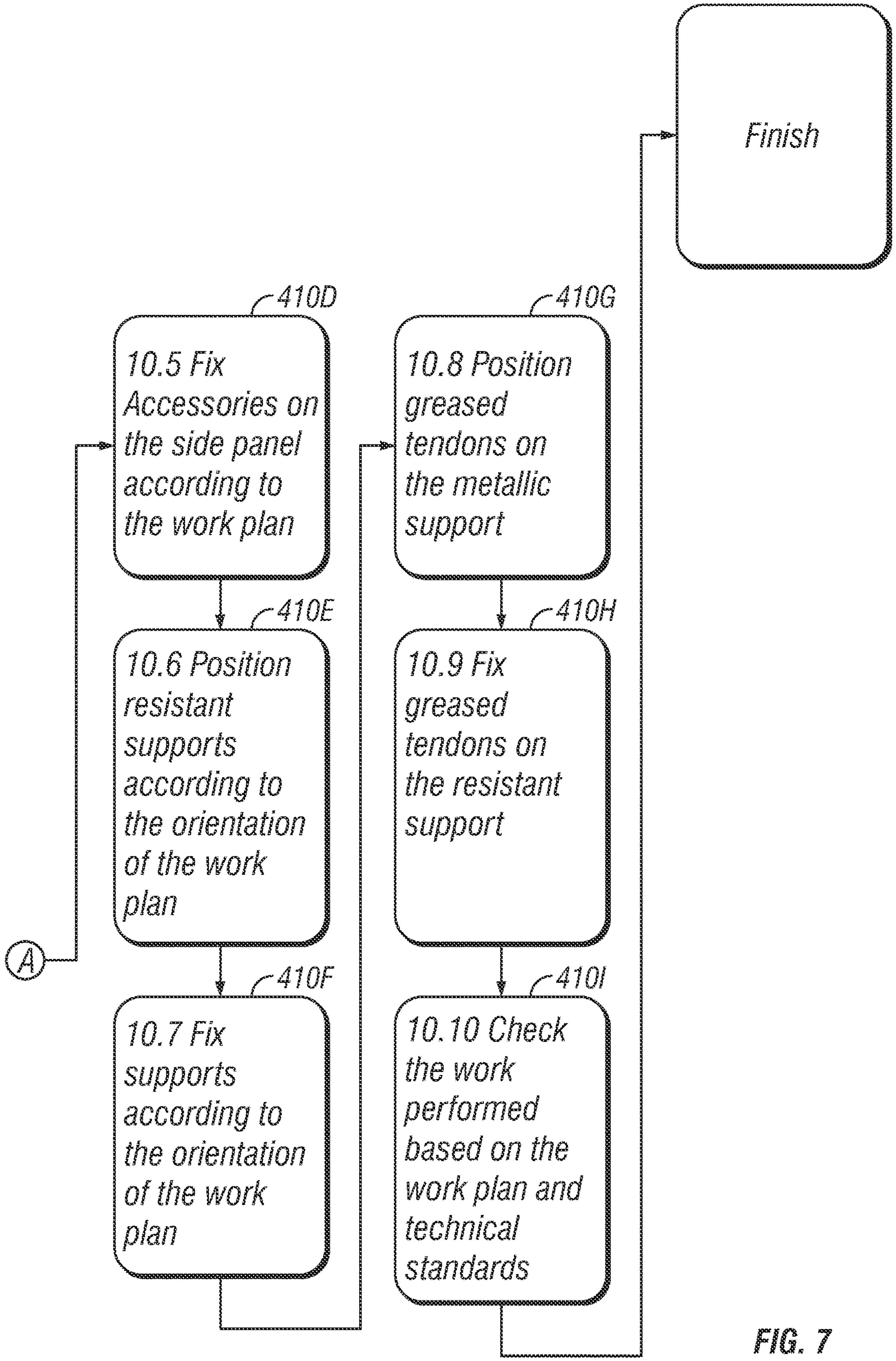

FIG. 4 shows a general flowchart of steps (401) to (410) of the resistant assembly method for grease and plastic coated tendons, which will be detailed below with reference to FIGS. 5, 6 and 7.

Figure 5:
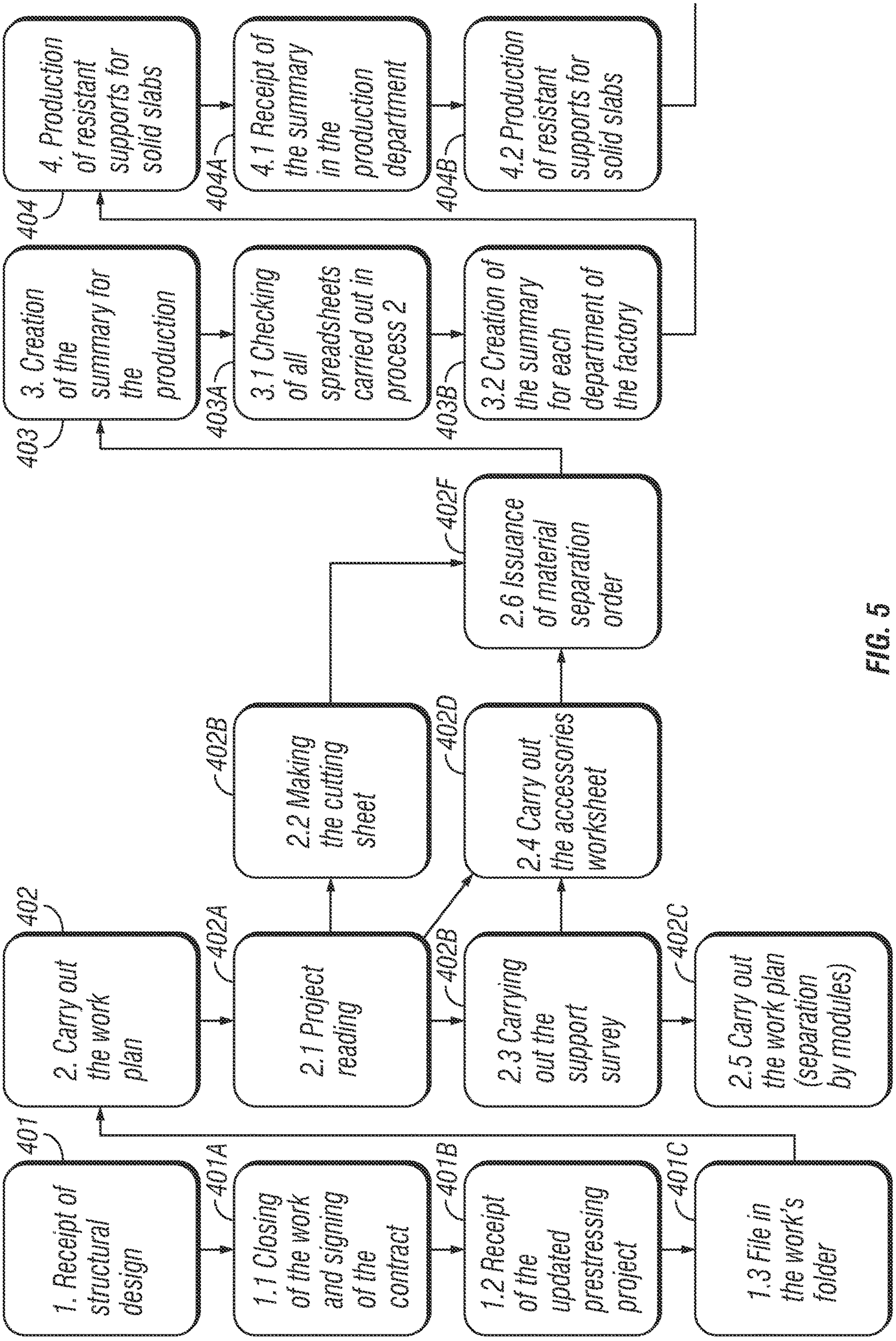
FIG. 5 shows a flowchart and detailed description of steps 1 to 4 (401 through 404 in FIG. 4) in the method.

FIG. 5 shows a flowchart and detailed description of steps 1 to 4 (401 through 404 in FIG. 4) in the method. FIG. 6 shows a flowchart and detailed description of steps 6 through 9 (406 through 409 in FIG. 4) in the method. FIG. 7 shows a flowchart and detailed description of step 10 (410 in FIG. 4) in the method.

Figure 4A:
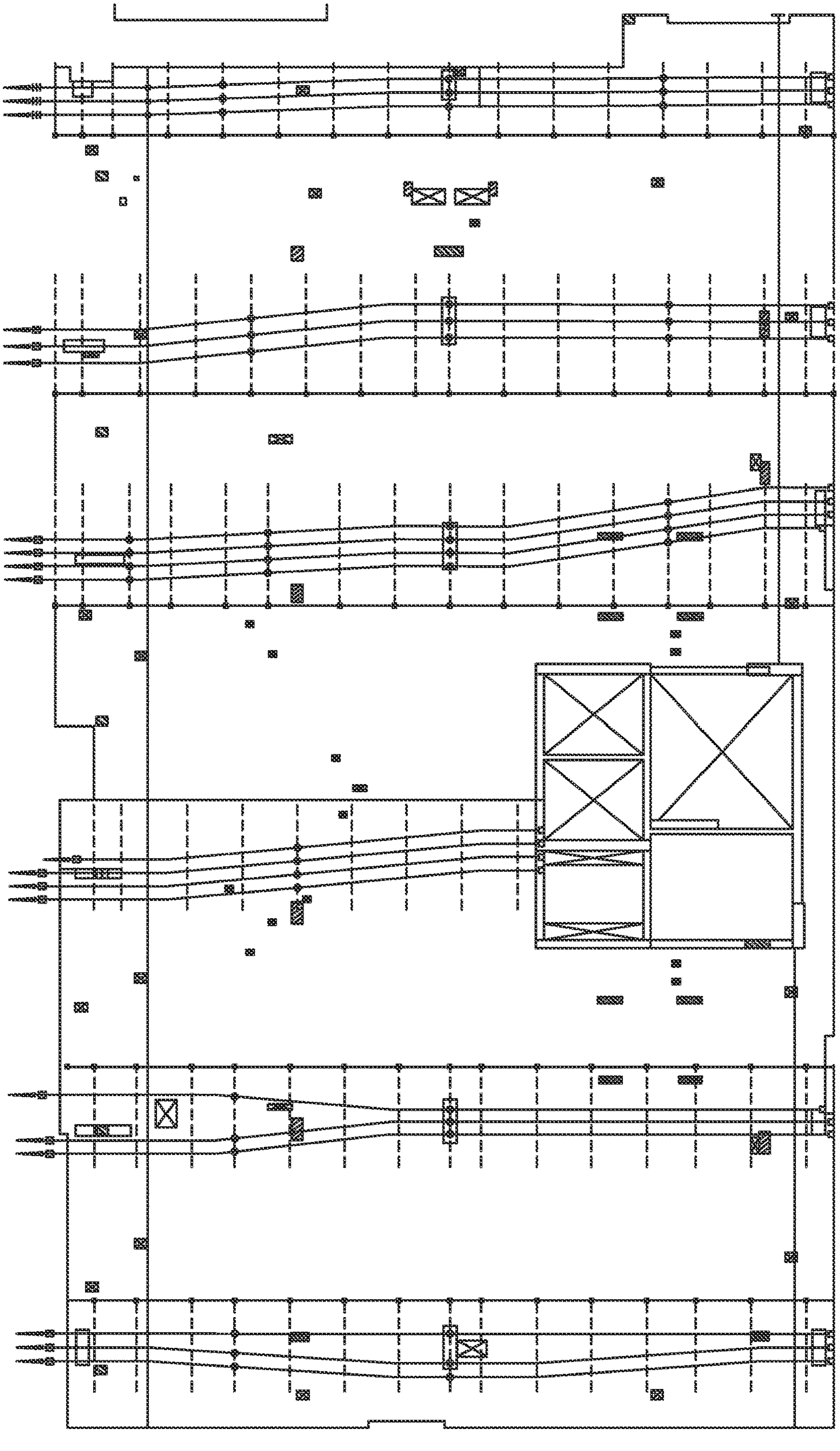
FIG. 4A presents the structural design of a prestressed solid slab with prestressed cables in strips od for grease and plastic coated tendons.
Figure 4B:
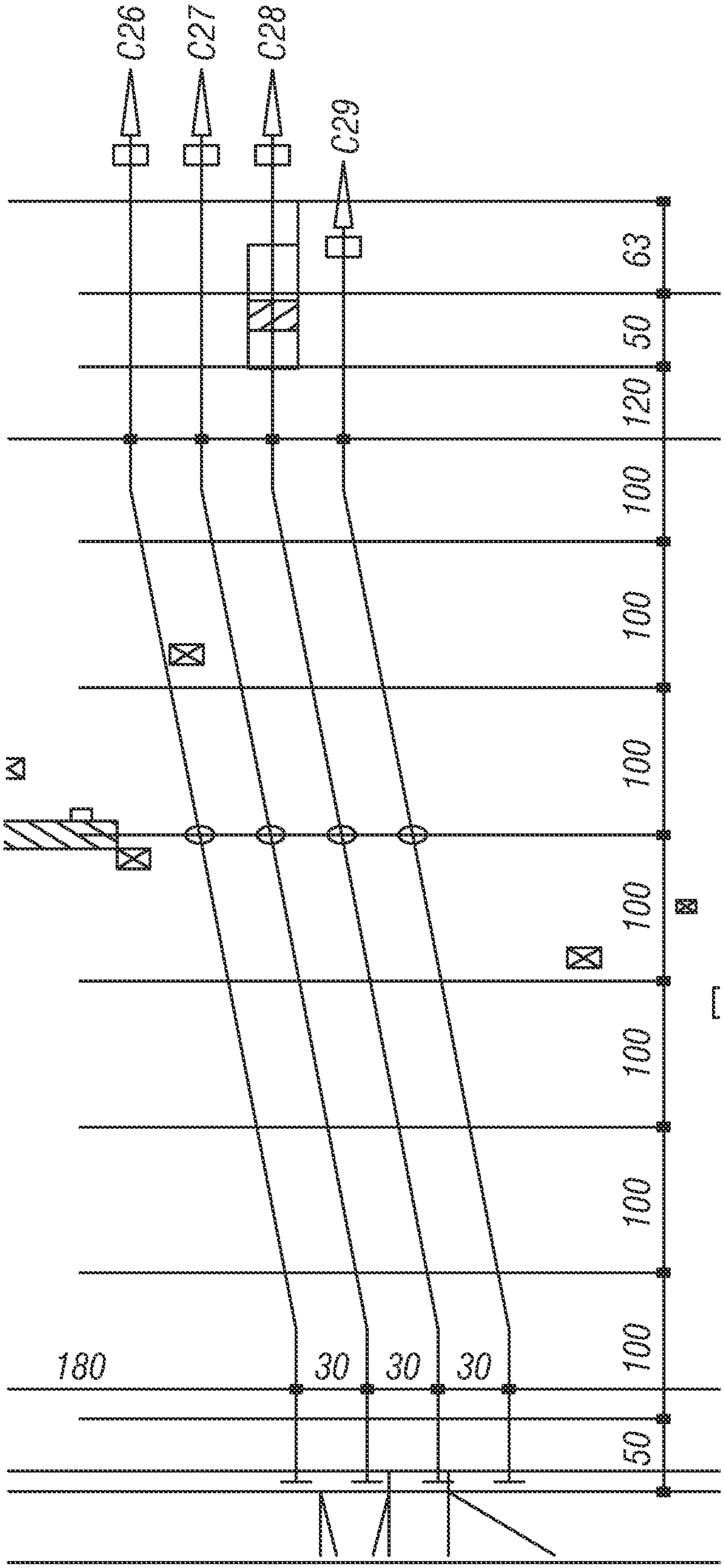
FIG. 4B shows the generic detail of a strip with four axes of strand demonstrating the horizontal layout and elevations along the slab.
Figure 4C:
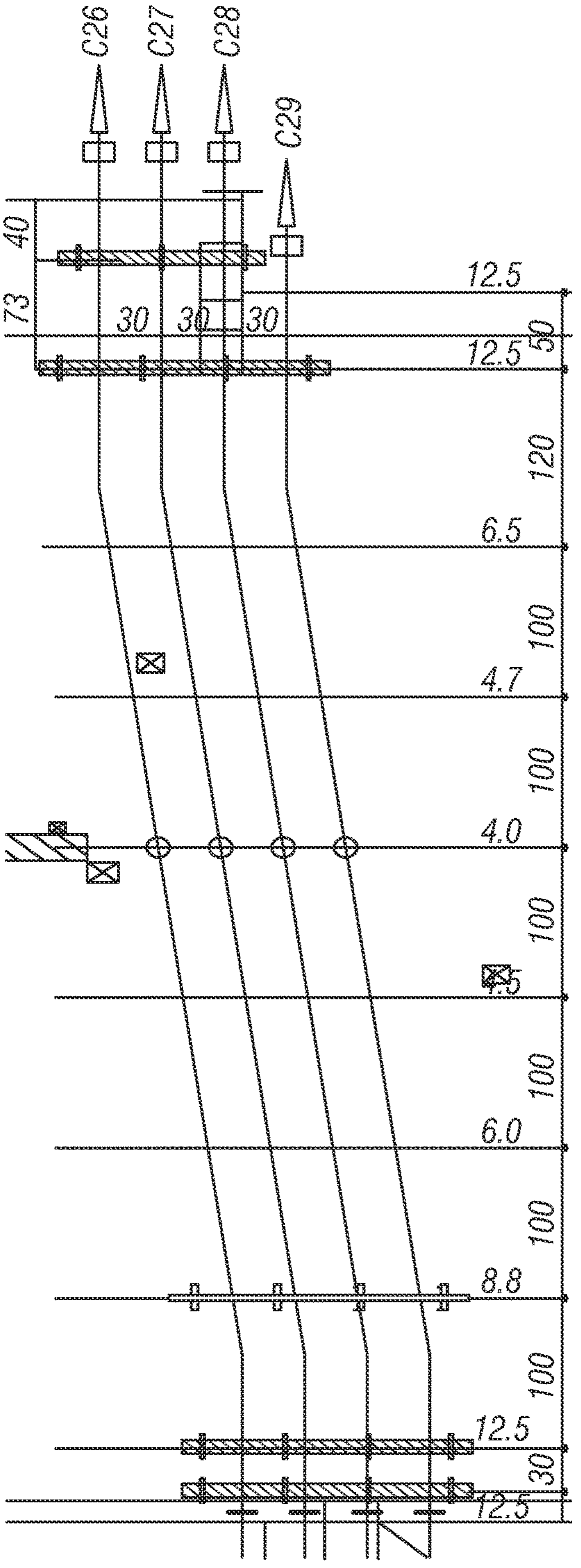
FIG. 4C shows the generic detail of a strip with four axes of tendon demonstrating the colors of the support.

STEP 1: RECEIPT OF THE STRUCTURAL PROJECT (401 in FIG. 4): With reference to FIG. 5, after closing the work and signing the contract (401A), the client (work) sends the most up-to-date versions of prestressing structural designs for solid slabs to the company (401B) and stores the file in the work folder (401C) to start the work plan (402 in FIG. 4). This step presents the structural design of a prestressed solid slab with prestressed cables in strips (see FIG. 4A); the generic detail of a strip with four axes of strand demonstrating the horizontal layout and elevations along the slab (see FIG. 4B) and the generic detail of a strip with four axes of tendon demonstrating the colors of the support (see FIG. 4C).

Figure 4F:
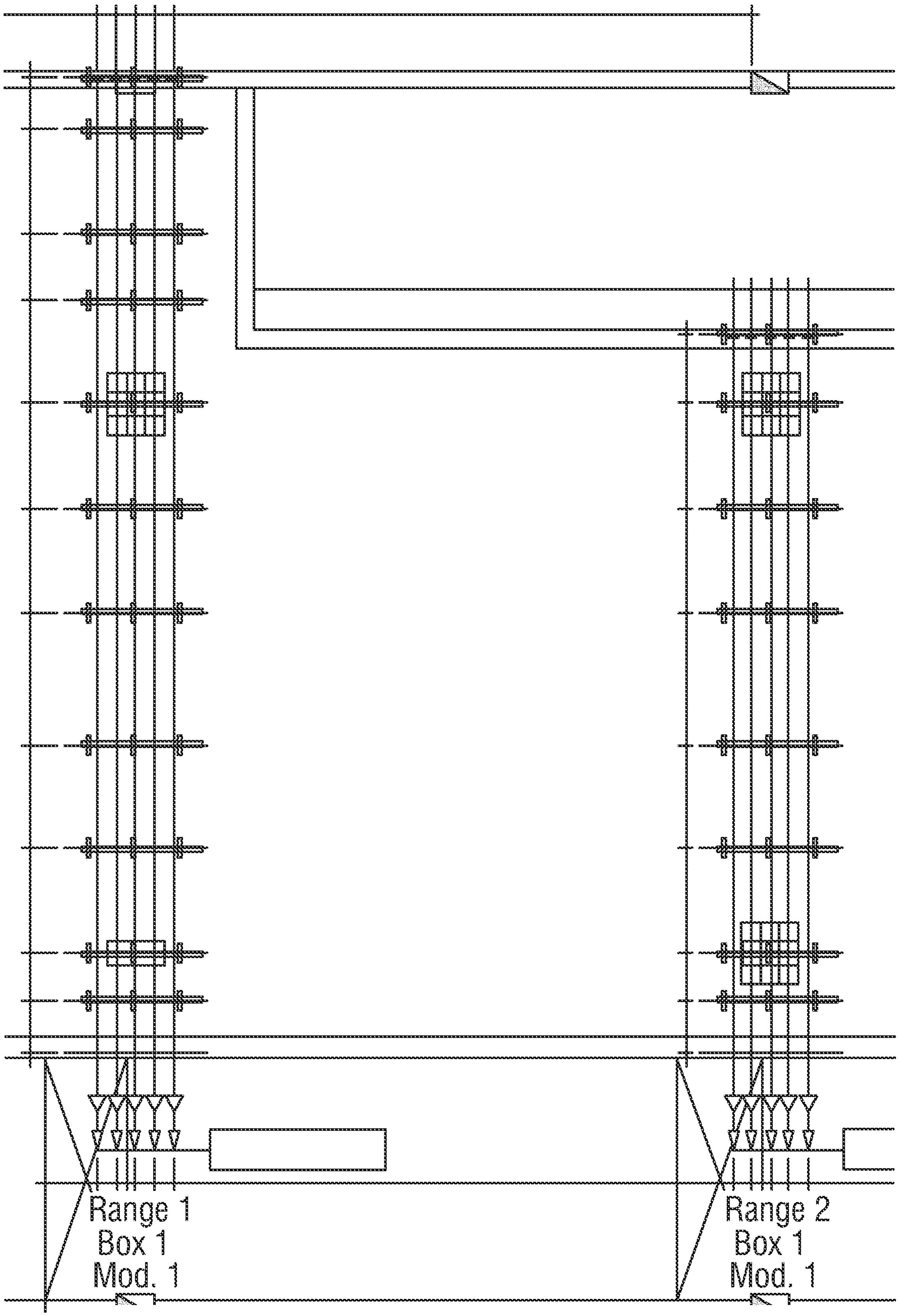
FIG. 4F presents the generic work plan demonstrating where each box and module is located.
Figure 4I:
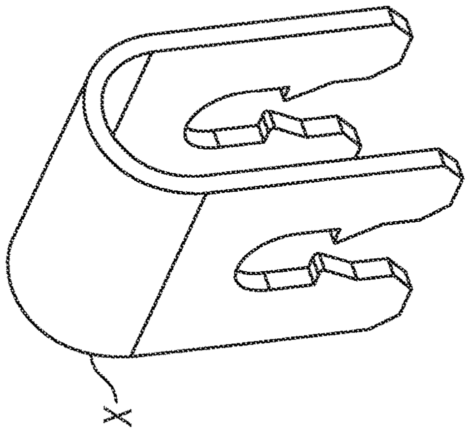
FIG. 4I shows the tendon fixer for resistant supports (X).
Figure 4J:
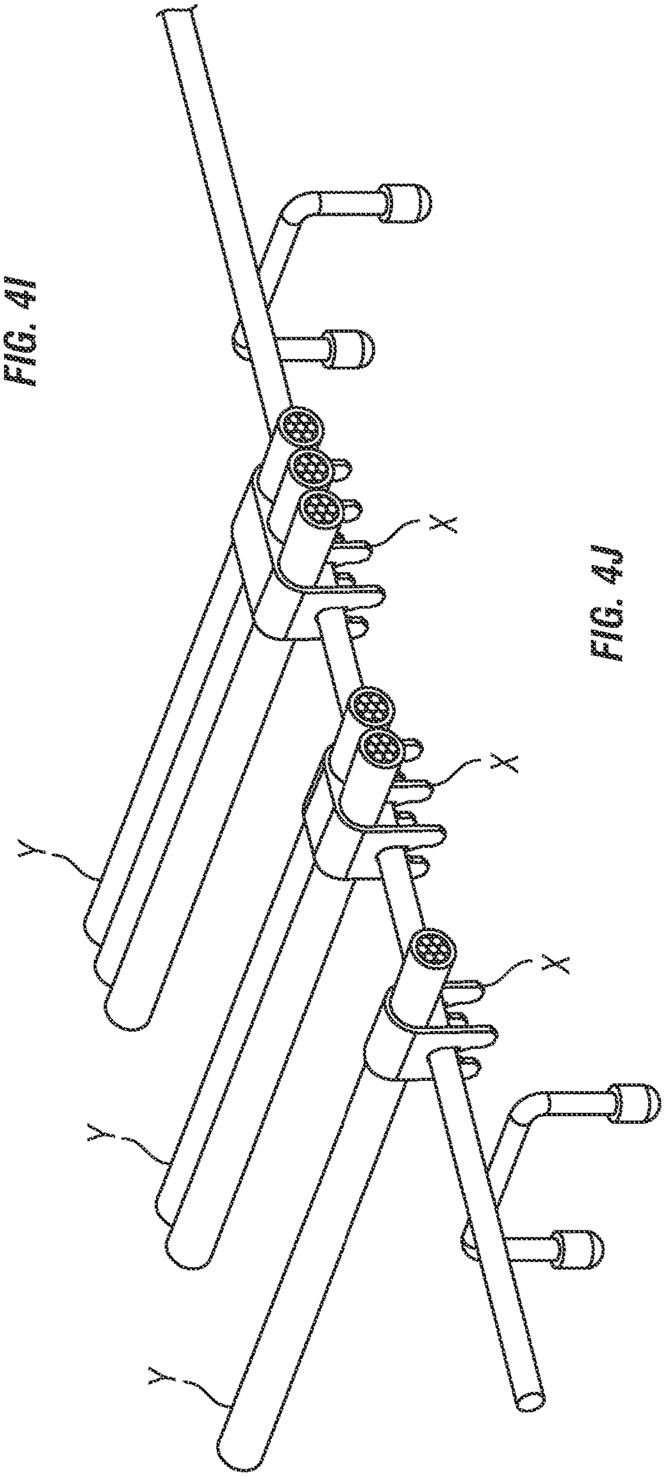
FIG. 4J shows the generic image of tendons attached to resistant supports.

STAGE 2: REALIZATION OF THE WORK PLAN (402 in FIG. 4): Still with reference to FIG. 5, as soon as the project arrives in the engineering department, the execution of the work plan begins by confirming the project version with the calculating engineer (402A). If the version is not up to date, the calculating engineer sends the new version to the company, otherwise, the work plan starts with the execution of the cutting worksheet (402B), where the person in charge extracts the information on the number of tendons from the project per axle and their length. FIG. 4D shows the generic cutting sheet used as an example (it shows the number of cables and their lengths). In parallel with the creation of the cutting sheet, a survey is carried out (402C) of the amount of resistant support for solid slabs (where each height defined by the calculating engineer is correlated with a color of resistant support) and the quantities of tendon fixers that will be used. necessary for the assembly of each floor. FIG. 4E shows an example of a resistant support spreadsheet for solid slabs (it correlates the height of the resistant supports with their respective colors in addition to providing the exact amount of resistant supports and in how many bars the work should be sent). Once the resistant supports have been surveyed, the work plan is drawn up in which the person in charge separates the project into modules (402E), where each module contains the exact amount of support and tendon fixer for the execution of that part of the project. FIG. 4F presents the generic work plan demonstrating where each box and module is located, the application of each box and module will be carried out and FIG. 4G shows the number of supports to be placed in a certain part of the slab. After carrying out a survey of the amount of resistant supports and tendon fixer, the number of accessories necessary for the execution of the floor is calculated (402D). FIG. 4H shows the spreadsheet with a summary of the number of active and passive anchorages in the work. After completing the survey of resistant accessories and supports, the engineering department generates a material separation order for the factory (402F), containing all the information for those responsible to separate the materials from the floors that will be sent to the work. FIG. 4I shows the tendon fixer for resistant supports (X) and FIG. 4J shows the generic image of tendons attached to resistant supports (Y) with the tendon fixer for resistant supports (X). The fixer is responsible for fixing the greased and plastic coated tendons on top of the resistant support (X in FIG. 4I) and uses a "clip" system between the tendon and the resistant support, so that there is no lateral movement and also eliminates the artisanal process mooring with annealed wire, as shown in Figures (4I) and (4J). The fixer was developed in order to fix only one tendon, two tendons, three tendons and 4 tendons, as shown in figure (4I).

STEP 3: CREATION OF SUMMARY FOR PRODUCTION (403 in FIG. 4): Still with reference to FIG. 5, through the project, information is extracted from the cutting worksheet (quantity and length of cables), survey of resistant support per module, survey of the tendon fixer and material separation order (anchoring, wedges and other accessories) (403A). This information is passed on to those responsible for each part of the factory for the production of all material (403B).

STEP 4: PRODUCTION OF RESISTANT SUPPORT ACCORDING TO SUMMARY (404 in FIG. 4): Still with reference to FIG. 5, with the summaries issued by the engineering department, those responsible for each sector of the factory start making the materials necessary for the execution of the required floors (404A and 404B).

STEP 5: SENDING RESISTANT SUPPORTS FOR DISPATCH (406): With reference to FIG. 6, once all the materials have been produced, the logistics department is activated and they are separated and checked to be sent to the work (406A and 406B.

STEP 6: STORAGE OF THE RESISTANT SUPPORTS INSIDE THE MODULABLE BOX (406): After separating the resistant support and the tendon fixers, the employee in charge checks the quantity and size of the resistant support to be assembled, as stipulated in the installation plan work, the modules of the box, allocating each support in its proper place according to the respective color identified in the work plan (406A and 406B).

STEP 7: SENDING TO THE WORK (407): With all the materials checked and packed, the logistics department prepares the invoices and transport packing list to be sent to the job (407A and 407B).

STEP 8: STORAGE OF THE BOX ON WORK (408): After the assembled box leaves the company's warehouse, it is received by the person in charge of the work upon arrival at the destination (408A). The person in charge checks the material received and stores it in an appropriate place (408B).

STEP 9: SENDING THE WORK PLAN TO THE PERSON IN CHARGE OF THE WORK (409): Following all steps and with all checklists checked, the regional manager sends it to the person in charge of the work through the contact email the work plan carried out by the engineering department (409A and 409B).

STEP 10: EXECUTION OF THE WORK PLAN: With reference to FIG. 7, the execution of the work has the following steps:

a. Upon arriving at the execution site, the person in charge of the company checks with those responsible for the work if the pavement is ready to be assembled (410A). If so, check the sent project with the floor to be assembled (410A-1, 410A-2 and 410$^{a}$-3, respectively);
b. If the work has a crane or similar heavy vertical transport equipment, it is recommended to transport the complete set (410B); if the equipment is a small winch, it is recommended to transport the complete module (410B-1); if there is no equipment for vertical movement, it is recommended to transport only the resistant support (410B-2);

c. Carry out the demarcation of the solid slab with marker pens, as ordered by the work plan (410C);

d. Fix the prestressing accessories to the side panel as indicated in the work plan 410D);

e. After checking the marking, carry out assembly assistance, positioning the resistant supports for solid slabs of each module in their respective location, following the work plan (410E);

f. With all the resistant supports for solid slabs in their respective places, the next step is to fix them to the positive reinforcement of the slab, as indicated in the work plan (410F);

g. When all the resistant supports are fixed, the greased tendons must now be positioned over them (410G) and fix them with the plastic tendon holder that replaces the annealed wire (410H);

h. As soon as the previous step is finished, the general supervisor or the unit manager checks the assembly and, if necessary, corrects possible errors or releases the slab for the next step (4101).

In short, a method and apparatus according to the present disclosure may have one or more of the following main advantages:

Packing of system materials: ease in controlling the use of materials in dispatch and in the field, minimizing possible counting and separation failures;

The intelligent and reusable modular structure, separated into four main modules which are identified by colors and numbers according to the assembly sequence stipulated by the work plan;

Works with cranes or cranes can lift the complete smart modular structure, works with smaller winches can only lift the secondary modules separately, works without equipment can manually transport the resistant supports;

With regard to the work plan: it aims to direct the person responsible for carrying out the assembly of greased wire tendons, the best assembly sequence. Identifying the materials by colors and numbers by section of slab, increasing productivity, safety, eliminating leftovers/shortages and/or waste of the materials used. I do not depend on the interpretation of the person in charge, generating greater savings for the work. Color system facilitates the conference and technical control of good practices required by the standard;

Safety: Guarantee of the correct fixation of the greased tendons in the resistant support.

The resistant supports are identified by color, reduce the amount of lashing and eliminate replacement rework due to breakage, increasing assembly productivity by up to 75% compared to the conventional system. Thus ensuring greater safety during the process of placing concrete, Reduction of up to 90% in the generation of waste during the assembly of greased and plastic coated wire tendons, due to the accuracy of the amount of material sent to the work through this work plan.

This disclosure presents accuracy and control of quantitative design and execution, in addition to promoting greater productivity, quality and safety in execution. In addition, it eliminates waste, generating sustainability and cost reduction.

What is claimed is:

1. A method for resistant assembly of grease and prestressed plastic coated tendons, comprising:

after executing a contract (1.1), a client (work) sends to a construction company a most up-to-date version of structural prestressing designs for massive slabs (1.2) and files the structural prestressing designs in a work folder (1.3) to start a work plan (2);

executing the work plan (2) as soon as the work plan arrives in an engineering department, the execution of the work plan beginning by a calculating engineer confirming a project version (2.1);

if a version of a project is not a most up-to-date version, the calculating engineer sending a new project version to the construction company, if the project version is a most up to date version, the work plan starts with execution of a cutting spreadsheet (2.2), where a person in charge extracts from project version information of a number of tendons per axis and a length of the tendons, in parallel with creation of a cutting sheet, a survey is carried out (2.3) of an amount of resistant supports for solid slabs that will be necessary for assembly of each floor of a building, after the support survey is carried out, the work plan is drawn up where a person in charge separates the project into modules (2.5), wherein each module contains an exact number of resistant supports for the execution of that part of the project, after carrying out the survey of the number of resistant supports, a number of active or passive accessories necessary for execution of a floor is calculated (2.4), once the survey of accessories and supports is completed, the engineering department generates a material separation order for a factory (2.6), containing all information for those responsible to separate materials for each floor that will be sent to a work site;

creating a summary for production (3): through the project, information is extracted from the cutting spreadsheet comprising a quantity and length of tendons, survey of resistant supports per module and the material separation order comprising at least anchoring and wedges (3.1), the information is passed on to respective parts of a factory for the production of all material (3.2);

producing resistant supports according to a summary (4): in possession of summaries issued by the engineering department, respective parts of the factory start producing materials necessary for execution of the floors in the work plan (4.1 and 4.2);

sending the resistant supports for dispatch (5): once all the materials have been produced by the respective parts of the factory, a logistics department is activated and the materials are separated and checked to be sent to the work site (5.1 and 5.2);

storing the supports inside a modular box (6): after separating the resistant supports, a responsible employee checks quantity and size of the supports and assembles then, as stipulated in the work plan, modules and sub-modules of the box, allocating each support in its proper place (6.1 and 6.2);

sending to the work site (7): with all the materials checked and packed, the logistics department prepares invoices and a transport packing list to be sent to the work site (7.1 and 7.2);

storing the modular box on the work site (8): after the assembled modular box leaves a warehouse, the modular box is received by a person in charge of the work upon arriving at the work site (8.1), the person in charge of the work checks the materials received and stores the checked materials in an appropriate place (8.2);

sending the work plan to the person in charge of the work (9): following all steps and with all checklists checked, a regional manager sends the work plan to the person in charge of the work through a contact e-mail work carried out by the engineering department (9.1 and 9.2);

executing of the work plan: executing the work plan comprising the following actions:

i. Upon arriving at the work site, a person in charge of the client checks with the person in charge of the work if pavement is already ready to be assembled (10.1), if the pavement is ready to be assembled, the person in charge of the work checks the sent project with the pavement that will be assembled (10.2.*a*; 10.2.*b* and 10.2.*c*);

ii. If the work has crane for heavy vertical transport, then transport a complete set of accessories and supports (10.3.*a*); if the vertical transport equipment is a winch, transport the complete individual modules (10.3.*b*); if there is no equipment for vertical movement, transport only sub-modules (10.3.*c*);

iii. Carry out demarcation of a first solid slab with marker pens, as ordered by the work plan (10.4);

iv. Fix prestressing accessories to a side panel as indicated in the work plan (10.5);

v. After checking the demarcation, carry out assembly assistance by positioning the resistant supports for solid slabs of each module in their respective location, according to the work plan (10.6);

vi. With all the resistant supports for solid slabs in their respective places, fix the resistant supports to positive reinforcement of the solid slabs, as indicated in the work plan (10.7);

vii. When all the resistant supports are fixed, the greased ropes are positioned on the resistant supports (10.8) and tying the greased ropes to the resistant supports with annealed wire over the resistant supports (10.9);

viii. As soon as the step vii is finished, a general supervisor or a unit manager checks assembly and, as necessary, corrects errors or approves the first solid slab for a next step (10.10).

* * * * *